(12) United States Patent
Motamed

(10) Patent No.: US 8,139,256 B2
(45) Date of Patent: Mar. 20, 2012

(54) METHOD AND SYSTEM FOR MERGING SCAN FILES INTO A COLOR WORKFLOW

(75) Inventor: Margaret Motamed, Foster City, CA (US)

(73) Assignee: Electronics for Imaging, Inc., Foster City, CA (US)

(*) Notice: Subject to any disclaimer, the term of this patent is extended or adjusted under 35 U.S.C. 154(b) by 0 days.

(21) Appl. No.: 11/327,070

(22) Filed: Jan. 5, 2006

(65) Prior Publication Data
US 2006/0114488 A1    Jun. 1, 2006

Related U.S. Application Data

(63) Continuation of application No. 09/661,489, filed on Sep. 14, 2000, now Pat. No. 7,002,700.

(51) Int. Cl.
*G06K 15/00* (2006.01)
(52) U.S. Cl. .......... 358/1.18; 358/1.1; 358/1.13
(58) Field of Classification Search .......... 358/452, 358/302, 1.1–1.9, 1.11–1.18; 715/763, 775; 382/284
See application file for complete search history.

(56) References Cited

U.S. PATENT DOCUMENTS

| | | | |
|---|---|---|---|
| 4,891,768 A | 1/1990 | Willems et al. | 364/518 |
| 5,133,494 A | 7/1992 | Wang et al. | 228/122 |
| 5,239,625 A | 8/1993 | Bogart et al. | 395/128 |
| 5,282,269 A | 1/1994 | Willems et al. | 395/164 |
| 5,732,230 A | 3/1998 | Cullen et al. | |
| 5,751,287 A * | 5/1998 | Hahn et al. | 715/775 |
| 5,760,775 A | 6/1998 | Sklut et al. | 345/349 |
| 5,790,119 A | 8/1998 | Sklut et al. | 345/349 |
| 5,796,411 A | 8/1998 | Cyman et al. | 345/502 |
| 5,828,814 A | 10/1998 | Cyman et al. | 395/102 |
| 5,845,302 A | 12/1998 | Cyman, Jr. et al. | 707/517 |
| 5,872,569 A | 2/1999 | Salgado et al. | 345/349 |
| 5,911,044 A | 6/1999 | Lo et al. | |
| 6,092,088 A | 7/2000 | Takeda | |
| 6,094,276 A | 7/2000 | Yamaguchi et al. | |
| 6,222,947 B1 * | 4/2001 | Koba | 382/284 |

(Continued)

FOREIGN PATENT DOCUMENTS
AU    2001286981    12/2004
(Continued)

OTHER PUBLICATIONS

Cynthia D. Hollingsworth, "Web Design: PowerPoint 2000 Basics", 2000, all document, http://www.iupui.edu/~webtrain/tutorials/powerpoint2000_basics.html.*

(Continued)

*Primary Examiner* — Twyler Haskins
*Assistant Examiner* — Lennin Rodriguez
(74) *Attorney, Agent, or Firm* — Michael A. Glenn; Glenn Patent Group

(57) ABSTRACT

A method and system for scanning documents in a network environment and merging the resulting scan files with other documents into a printing workflow provides a user interface in which the user merges a scan file and a document file on a page basis by selecting thumbnail images of the desired pages and dragging and dropping the thumbnails so that a new merged document results. An alternative embodiment allows the user to apply predefined merge templates to the selected pages. The predefined merge templates may include printing and formatting instructions such as color settings and a page layout.

44 Claims, 12 Drawing Sheets

U.S. PATENT DOCUMENTS

| | | |
|---|---|---|
| 6,453,127 B2 | 9/2002 | Wood et al. |
| 6,509,974 B1 * | 1/2003 | Hansen .................. 358/1.12 |
| 6,549,302 B1 * | 4/2003 | Takeda et al. .......... 358/1.9 |
| 6,549,974 B2 | 4/2003 | Kaki et al. |
| 6,616,359 B1 * | 9/2003 | Nakagiri et al. ........ 400/582 |
| 6,642,943 B1 * | 11/2003 | Machida ................. 715/763 |
| 6,922,807 B1 | 7/2005 | Miyata |

FOREIGN PATENT DOCUMENTS

| | | |
|---|---|---|
| EP | 0 218 287 | 5/1987 |
| EP | 0 218 287 A1 | 5/1987 |
| EP | 0 217 447 | 7/1991 |
| EP | 0 217 448 B1 | 7/1991 |
| EP | 0 214 091 B1 | 7/1992 |
| EP | 0 241 091 | 7/1992 |
| EP | 0 346 388 B1 | 2/1993 |
| EP | 0 814 425 | 12/1997 |
| EP | 0 814 425 A2 | 12/1997 |
| EP | 0 837 401 A2 | 4/1998 |
| EP | 0 837 401 A3 | 4/1998 |
| EP | 0 858 041 | 8/1998 |
| EP | 0 858 041 A2 | 8/1998 |
| EP | 0 814 425 | 8/1999 |
| EP | 0 814 425 A3 | 8/1999 |
| EP | 0 770 575 | 5/2000 |
| EP | 0 770 575 B1 | 5/2000 |
| EP | 01966472.1 | 6/2005 |
| EP | 01966472.1 | 7/2007 |
| ER | 0 217 447 B1 | 7/1991 |
| WO | PCT/US2001/27176 | 4/2002 |
| WO | PCT/US2001/27176 | 11/2002 |

OTHER PUBLICATIONS

Angie Rawling, "Microsoft PowerPoint 2000", Release Date: Mar. 29, 2000, p. 2, http://www.vtc.com/products/Microsoft-PowerPoint-2000-tutorials.htm.* eBook "PowerPoint 2000/98: Visual QuickStart Guide", published May 7, 1999, pp. 344, 383-389, 473-475.*

Article by William E. Neale, "A New Generation of Com Recorder Brings New Applications and Opportunites", International Journal of Micrographics & Optical Technology, vol. 14 1996, pp. 8-10.

* cited by examiner

FIG. 12

| ScanBuilder screens | | | | | |
|---|---|---|---|---|---|
| Selected option is the default | | | | | |
| Print Pages ▲ | | | | | |
| Scan Job ▲ | new selection | | | | |
| Suspend Printing ▲ | | | | | |
| Resume Printing ▲ | | | | | |
| Shtudown ▲ | | | | | |
| Clear Server ▲ | | | | | |
| Run Setup ▲ | | | | | |
| Run Diagnostics ▲ | | | | | |
| Calibration ▲ | | | | | |
| Functions | | | | | |
| Start Scan ▲ | Document Source | Original Size | Orientation | Sides | |
| Source ▲ | ADF | Letter | Portrait | Single | |
| Image Options ▲ | OK ▲ | OK ▲ | OK ▲ | OK ▲ | |
| Destination ▲ | Source | Source | Source | Source | |
| Clear All Scan Jobs ▲ | | | | | |
| Scan Options | | | | | |
| | Image Type | Compression | Resolution | | |
| | Text | On | (max engine res.) | | |
| | OK ▲ | OK ▲ | OK ▲ | | |
| | Image Options | Image Options | Image Options | | |
| | File Name | Destination | File Format | Mailbox | |
| | user defined | DocBuilder | destination, image type dependent | user defined | |
| | OK ▲ | OK ▲ | OK ▲ | OK ▲ | |
| | Destination | Destination | Destination | Destination | |
| | Clear Each Scan Job | | | | |
| | 24 hrs after scan | | | | |
| | OK ▲ | | | | |
| | Save Template | | | | |

METHOD AND SYSTEM FOR MERGING SCAN FILES INTO A COLOR WORKFLOW

REFERENCE TO RELATED APPLICATIONS

This application is a continuation of U.S. application Ser. No. 09/661,489, filed 14 Sep. 2000, now U.S. Pat. No. 7,002,700.

BACKGROUND

This invention relates to document scanning in a network environment. More particularly, this invention relates to a simplified method and system for merging scan files into a color workflow wherein the scan files are merged with document files on a page basis and job properties are applied to the resulting merged document.

In print shop environments, it is often necessary to combine electronic images created by scanning hard copy documents with an existing document file to produce a new document consisting of the images interspersed with the pages of the previous document in a desired order. For example, in the production of an illustrated calendar, photographs may be scanned to produce the calendar illustrations. The scans are then interleaved with the calendar pages, which may have been produced in a page layout program or a word processor. Subsequently, additional layout may be specified such as imposition or single sided vs. duplex printing. Additional job options are specified, such as resolution, color profile and print profile, and the document is output to a color printer. Thus, the production of such a document is a highly repetitious and time-consuming operation, and it requires a complex, multi-step workflow. Since print shops are production-type environments, there is an ongoing interest in increasing efficiency without sacrificing quality.

Various hardware components for accelerating the printing process are reported in the art. For example, Willems et al. U.S. Pat. No. 4,891,768 and Willems et al. European Patent Application No. 0218287 both disclose hardware configurations that utilize a raster image bus to accelerate the processing of information so that a higher throughput is provided to the print device. Menendez et al. U.S. Pat. No. 5,113,494 also describes an improved raster image processor capable of providing output to a printing device at higher speeds than previously possible. The improvement is achieved by performing various image processing operations in parallel that had previously been performed serially. The disclosed devices enable higher throughput of data to a printing device, but they do not address the problem of simplifying and accelerating complicated printing workflows, or of automating repetitive operations.

W. E. Neale, "A New Generation Of COM Recorder Brings New Applications And Opportunities," International Journal of Micrographics and Optical Technology, 14:5, pp. 8-10 (1996), discloses methods for transferring scanned bitmap images and merged documents to microfilm. The disclosed methods do not address the need in the art for accelerating the workflow by providing simple intuitive methods of merging document files and specifying job options.

Consequently, there is a need in the art for merging document files of various formats into a single workflow. It would be a further advantage to provide a means of merging scan files with document files on a page basis so that a new, merged document results. It would be desirable to provide a graphical user interface that allowed a user to produce such merged documents in a simple, intuitive manner. It would be advantageous to provide a simple way of specifying merging instructions and other job options in the form of merge templates that can be created, saved and reused for future jobs.

It would be highly advantageous to implement such methods in a network scanning environment that allowed a user to specify multiple destinations and formats for a scan file. The capability of applying image modifications to scan files prior to merging would be highly desirable.

SUMMARY

This invention provides a method and system for document scanning in a network environment. A graphical user interface allows scan files to be merged with other document files into a printing workflow. The user creates and applies a set of merging instructions by selecting desired pages from the files to be merged and dragging and dropping thumbnail images of the selected pages from a source document to a destination document so that a new, merged document is created. In another embodiment of the invention, merge templates having predefined merging instructions are selected and applied to the desired pages. The templates may be created by saving previously generated merging instructions. In other embodiments of the invention, scripted merge templates are created manually, or by means of a workflow application, and then applied to a set of selected pages.

The system architecture includes a color print server with an attached scanning device and a client workstation in communication with the color print server. In one embodiment, scanning software is run locally on the color print server, and may be accessed through a graphical user interface ("GUI"). In other embodiments, the interface may be a liquid crystal display ("LCD") interface on the color print server. In still other embodiments, the color print server is embedded in a color printing device and may be accessed through the control panel of the printing device. In an alternate embodiment, the scanning software is run remotely from the client workstation. Scans are initiated at the color print server and the resulting files are stored in a mailbox carrying a numerical designator on a mass storage device connected to the print server. After scanning, the scan file may be retrieved and modified.

BRIEF DESCRIPTION OF THE DRAWINGS

Features of the present invention can be more clearly understood from the following detailed description considered in conjunction with the following drawings, in which the same reference numerals denote the same elements throughout, and in which:

FIG. 12 shows an LCD interface for initiating and modifying scans on a color print server, according to the invention.

DETAILED DESCRIPTION

The invention provides a method for merging document files on a page basis. Pages are selected from two or more document files and the selected pages are combined into a new, merged document. The resulting document file may subsequently be viewed, archived or printed.

Figure 1:
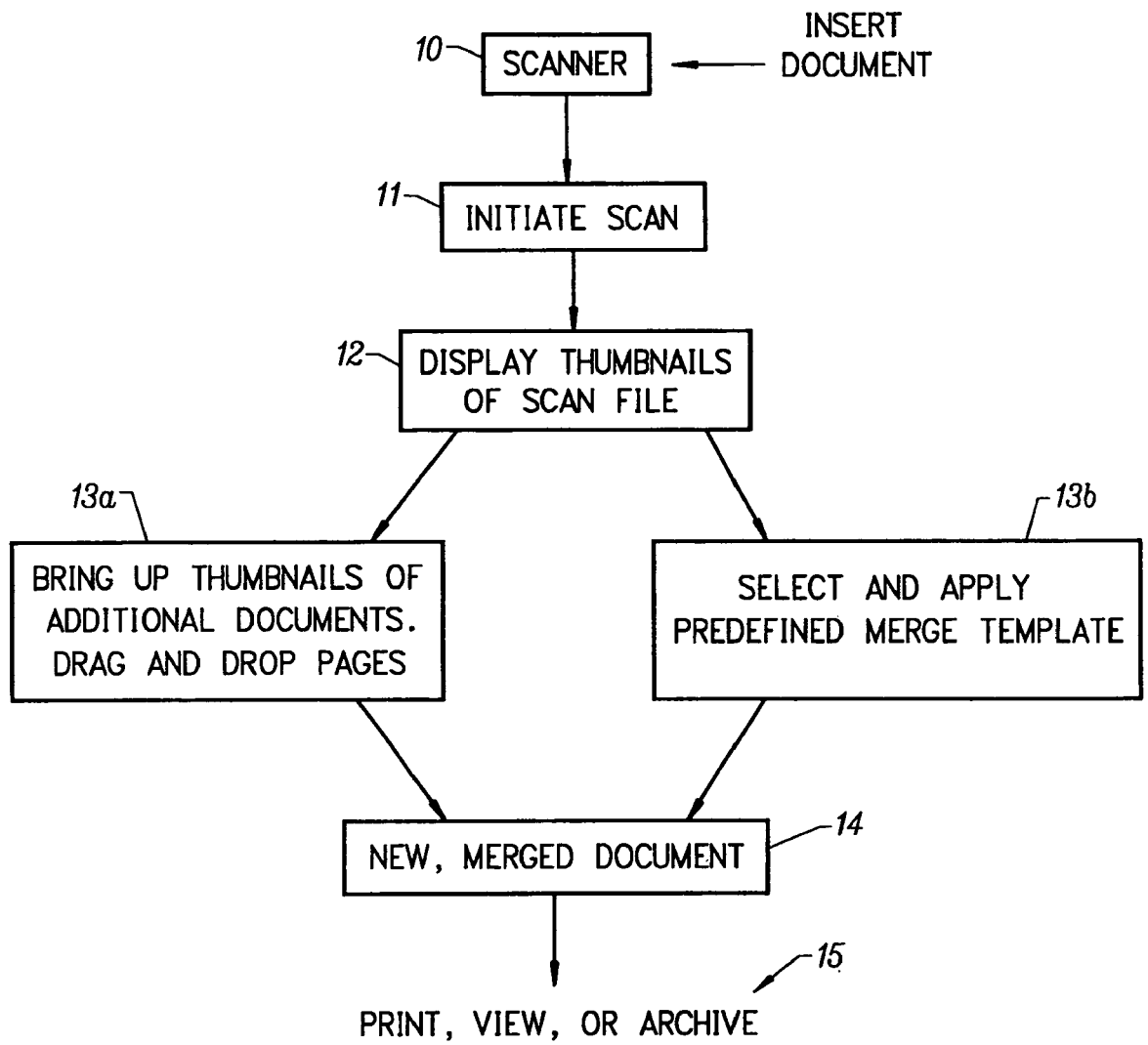
FIG. 1 provides a block diagram of a method for merging scan files with document files on a page basis, according to the invention.

Referring now to FIG. 1, a scanning device 10 is provided. As further described below, the scanner may be local to a workstation or it may be accessed over a network connection to a color print server. In a preferred embodiment of the invention, the scanning device is equipped with an automatic document feeder ("ADF") to facilitate the scanning of multi-page documents. In other embodiments, the scanner may comprise the platen of a copying machine. To begin, the user places a document to be scanned in the scanning device 10, and initiates a scan 11 by executing a 'scan document' command from the GUI of a scanning software application, to be described in greater detail further below. In a preferred embodiment of the invention, the scan file is converted to a ".PDF" file. In other embodiments the scan file may comprise a raster data file, a bitmap file, or another page description format such as POSTSCRIPT ("PS") or Page Construction Language ("PCL"). After the document is scanned, the user directs the scan file to a job management utility. In the interface of the job management utility, thumbnail images of the separate pages of the scanned document are displayed 12. The user then retrieves another document file by selecting it from a displayed directory of document files. The pages of the second file are displayed as thumbnail images 13a. The second document may be another scan file or it may be an existing document file in any of the file formats previously mentioned. The user then selects pages from the two document files. In one embodiment, page selection is accomplished by clicking the thumbnail image of the desired page with a mouse. However, other commonly known methods of selecting graphical objects may be substituted without departing from the spirit and scope of the invention. After the pages from each document are specified, the user then combines the pages according to a desired order by dragging and dropping the thumbnail images, until they are arranged in the desired order.

Figure 2:
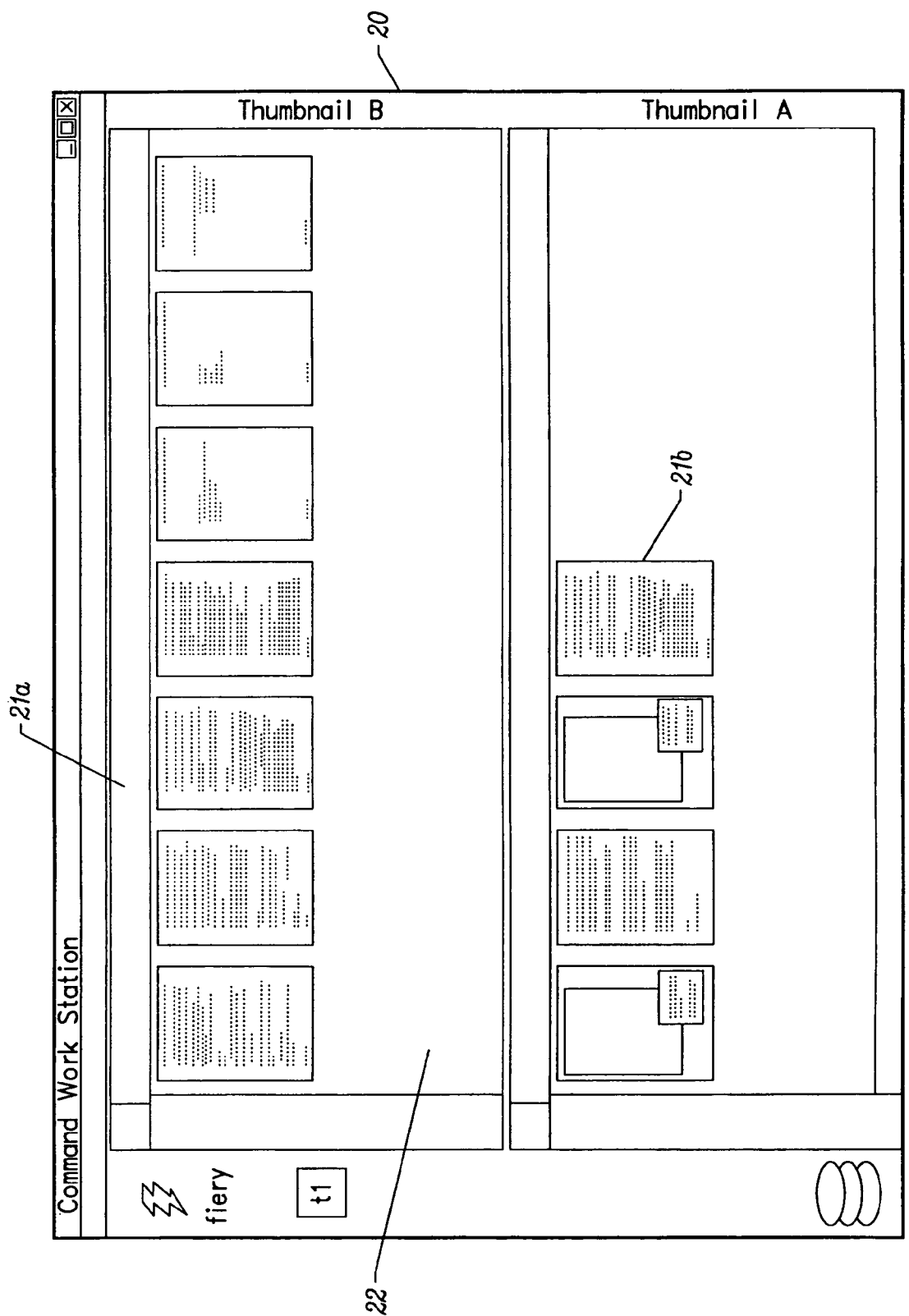
FIG. 2 illustrates a graphical user interface of a job management utility for merging document files on a page basis, according to the invention.

FIG. 2 illustrates the process of selecting and combining pages. The user interface of a job management utility includes a multi-frame window 20. The upper frame contains Thumbnail 'B', representing a document having eight pages, although the user would have to scroll to the left to see the thumbnail of page one. As indicated by the arrow 22, page four (21a) from thumbnail 'B' is selected and dragged to the lower frame to become page four (21b) in thumbnail 'A,' thus creating a new merged document 14. Subsequently, additional pages from Thumbnail 'B' may be added, and the pages may be reordered. Finally, the merged document may be previewed 15 or it may be routed directly to the print workflow without previewing. Additionally, the merged document may be archived as a new document file.

The user may elect to save the merging instructions generated during the creation of the merged document to a merge template. The resulting merge template may be selected and applied at a future time to other document files. As an alternative to dragging and dropping page thumbnails, the user may select a predefined merge template from a menu of templates 13b. The predefined merge templates are generated in any of several ways. They can be generated as previously described, by saving merging instructions generated during the creation of a document. Additionally, the merging instructions may be scripted, either manually or through the use of a workflow software application. Several examples of scripted merging instructions are shown below:

Where A, B and C represent source documents:

Example 1—page order=A1 A2 A3 B1 B2 B10 A9 C20 C1 C2.

Example 2—page order=A1 B1 A2 B2 A3 B3 repeat pattern until end of one document.

Example 3—page order=C1 C2 A1 B1 A2 B2 . . . A100 B100 C3 C4, etc.

Thus, a predefined page order may be applied to the selected pages in a single step, requiring a minimal amount of time and effort on the part of the user.

The merge template constitutes a valuable tool for accelerating and simplifying the printing workflow and its utility is not limited to specifying pagination in merged documents. The merge template may also incorporate instructions for imposition, the placement of multiple pages on a single sheet. For example, if the source pages were originally in an 8½"×11" format, the user may desire to print several pages on a single sheet, perhaps to publish the document in pamphlet or booklet form. The merge template may be used to include instructions for printing the document "four up," meaning four pages per sheet. The example immediately preceding is not meant to be limiting. Additionally, single-sided or duplex printing may be specified. The merge template may be used to specify any layout parameter or color setting that would be specified in the job ticket for a print job including:

Source RGB
Color profile
Source type (image, text, graphics)
Saturation
True Color
Smoothing or anti-aliasing
Toner reduction, and
Print modes.

Other applications of the merge template will be apparent to those skilled in the arts of computer graphics and digital printing. Thus, based on past print jobs that have been successful, the user is able to specify multiple parameters and settings with a single selection simply by applying a predefined merge template incorporating all of the settings of the previous job that were successfully applied.

Figure 3:
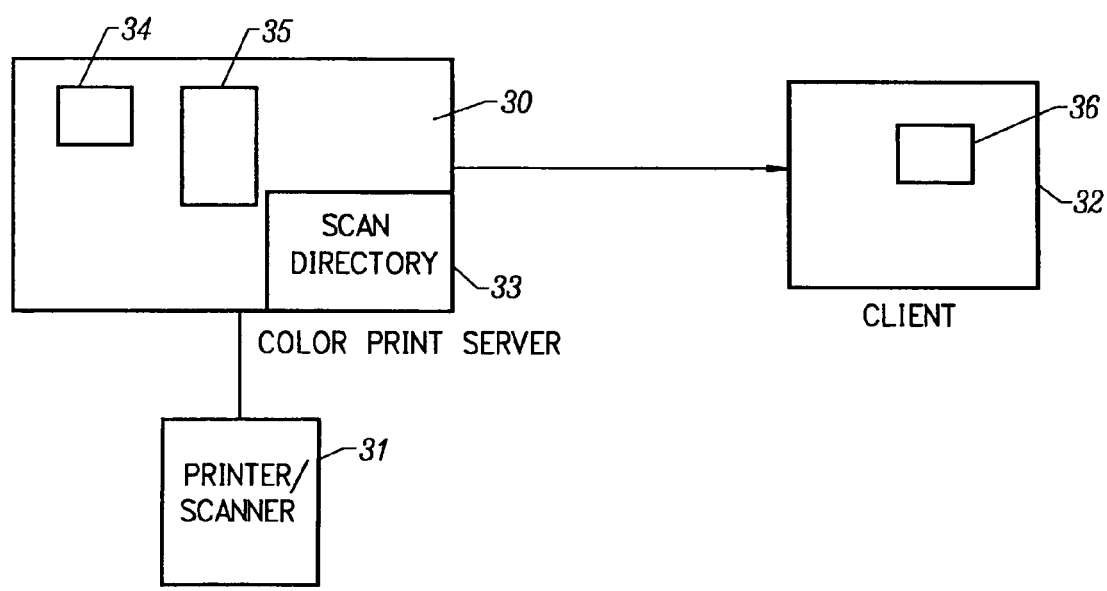
FIG. 3 provides a block diagram of a system for color scanning in a network environment, according to the invention.

Referring now to FIG. 3, a block diagram of an exemplary system in accordance with this invention is described. A color print server 30 is provided. Resident thereon is a scanning management software module 34 for managing scanning in a network environment. Connected to the color print server is a scanning device 31. In some embodiments, the scanner is a dedicated scanner equipped with an ADF. The scanning device 31 may also be the platen of a color copying machine. Also resident on the color print server is a scanning software application 35 having a user interface through which the user may perform various tasks related to document scanning, including:

Source definition
Set destination
Save to network location
Export to printstream
Image modification during scanning; and
Image modification post-scan.

In an exemplary embodiment of this invention, the interface constitutes a GUI on a display device connected directly to the color print server. In an alternate embodiment, the user interface constitutes an LCD interface mounted directly on the color print server. FIG. 12 shows an exemplary LCD interface. A client workstation 32 is in communication with the color print server 30. The job management utility 36 previously described resides on the client workstation.

Figure 6:
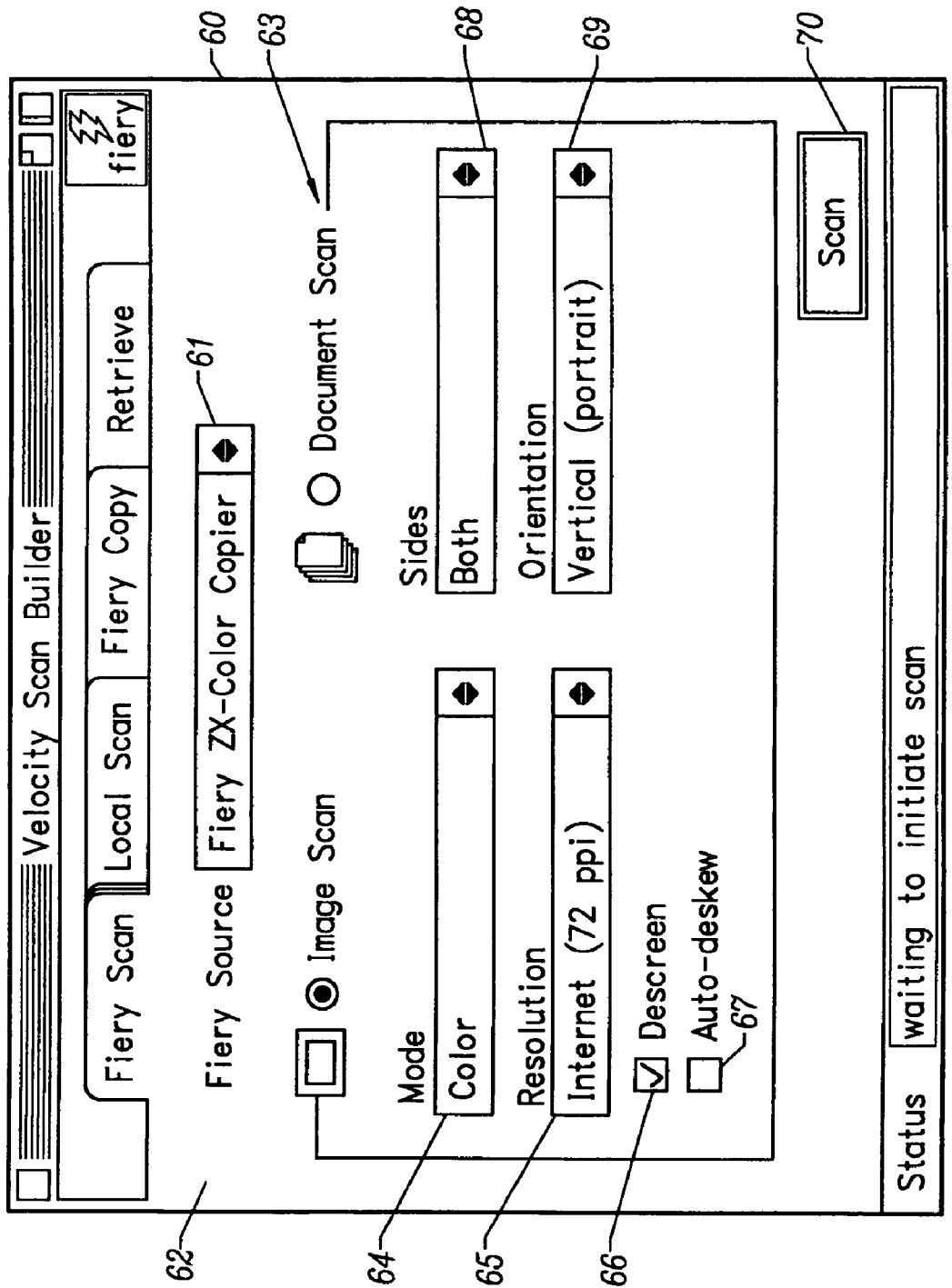
FIG. 6 shows a user interface for initiating a network scan in a scanning software application, according to the invention.

Referring to FIG. 6, shown is a dialog box 60 for initiating a scan on the color print server 30. A pull down menu 61 allows the user to specify the scan source. As previously mentioned, the scanner may be either a dedicated scanner equipped with an ADF or it may be the platen of a color copier. In this case, the scan source is a color copier. Controls 62 and 63 are provided for specifying the source type, image or document. A pulldown menu 64 allows the user to specify the scan mode, the three options being:

Color
Black and white
Photograph.

Figure 7:
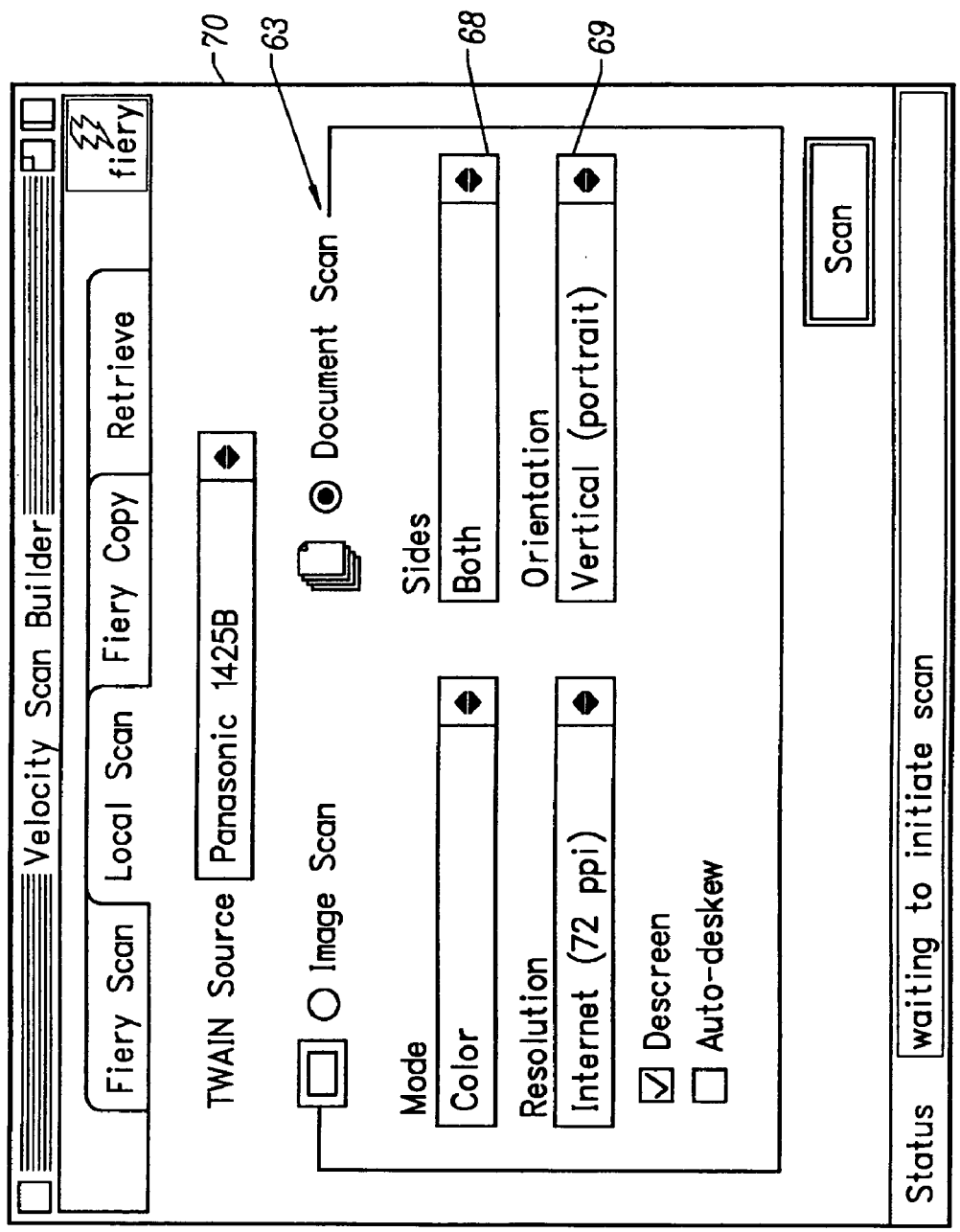
FIG. 7 shows a user interface for initiating a local scan in the scanning software application of FIG. 6, according to the invention.

A pulldown menu 65 allows the user to specify scan resolution in pixels per inch ("PPI"). Checkboxes 66 and 67 allow the user to select or deselect 'Descreen' and 'Auto-deskew.' A pulldown menu 68 allows the user to specify the number of sides that must be scanned, with the options being 'Single' and 'Both.' However, double-sided scanning is only supported in scanners having an ADF. In the example of FIG. 6, scanning is performed from a color copier's image glass (platen) so the 'Sides' pulldown 68 is grayed-out. In FIG. 7, a scanner equipped with an ADF is selected, and therefore the 'Sides' pulldown 68 is enabled. Additionally, page orientation 69 may be specified, the options being 'Vertical (portrait)' and 'Horizontal (landscape).' Finally, the user initiates the scan by clicking the 'Scan' button 70. As the scan is being performed, the video ASIC of the scan engine may apply a compression format to the scan data, or the scan may be saved directly to the drive of the color print server in a native file format. In the case of a color image, the scan may be converted to the JPEG format, and in the case of a black & white image, the scan may be converted to the .JBIG format.

Figure 8:
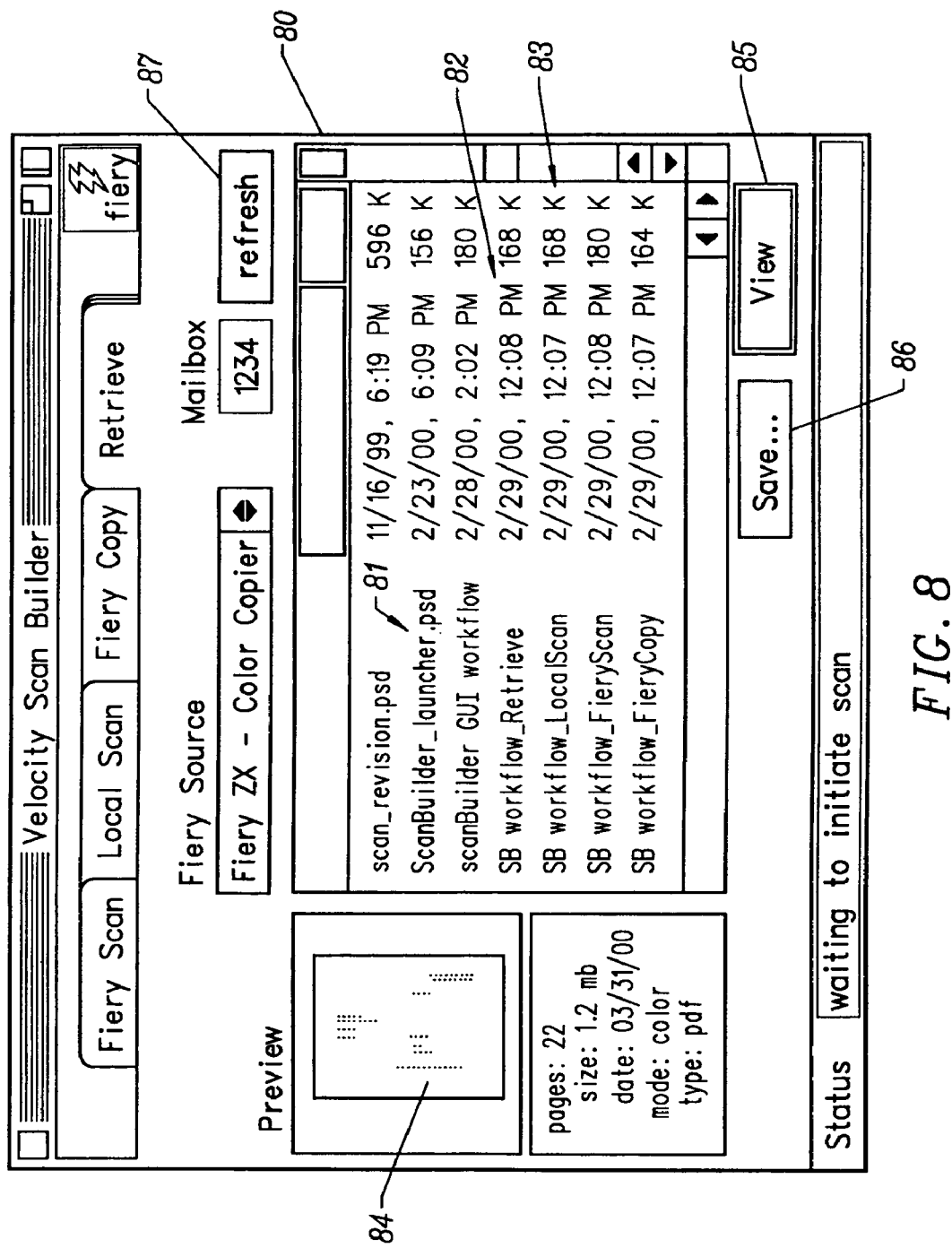
FIG. 8 shows a user interface for retrieving scan files in the scanning software application of FIG. 6, according to the invention.

When the scan is complete, the scan file is temporarily saved to a mailbox 87 carrying a numerical designator on the drive of the color print server. After a scan is saved to its temporary location, the user may further specify a final destination for the scan file. FIG. 8 shows a dialog 80 for retrieving scan files.

When the scan is saved to the mailbox 87, the scanning application assigns the scan file a default file name 81 and affixes a time and date stamp 82. In addition, the file size 83 is given. Thumbnail images 84 of the scan file provide a preview capability. A 'Save' button 86 allows the user to specify another destination for the scan file according to the following options:

import into the job management utility 36—the scan application converts and stores the file as a .PDF file on the drive of the color print server, to be retrieved later by the job management utility 36 resident on the client workstation 32;

save to a network location of the user's choice in a file format specified by the user;

the scanner application will send an email notification of the file's existence with a clickable hyperlink to the file's URL on the drive of the color print server;

the scan file may be faxed to a user-specified destination; and the scan file may be exported to the print stream.

Figure 9:
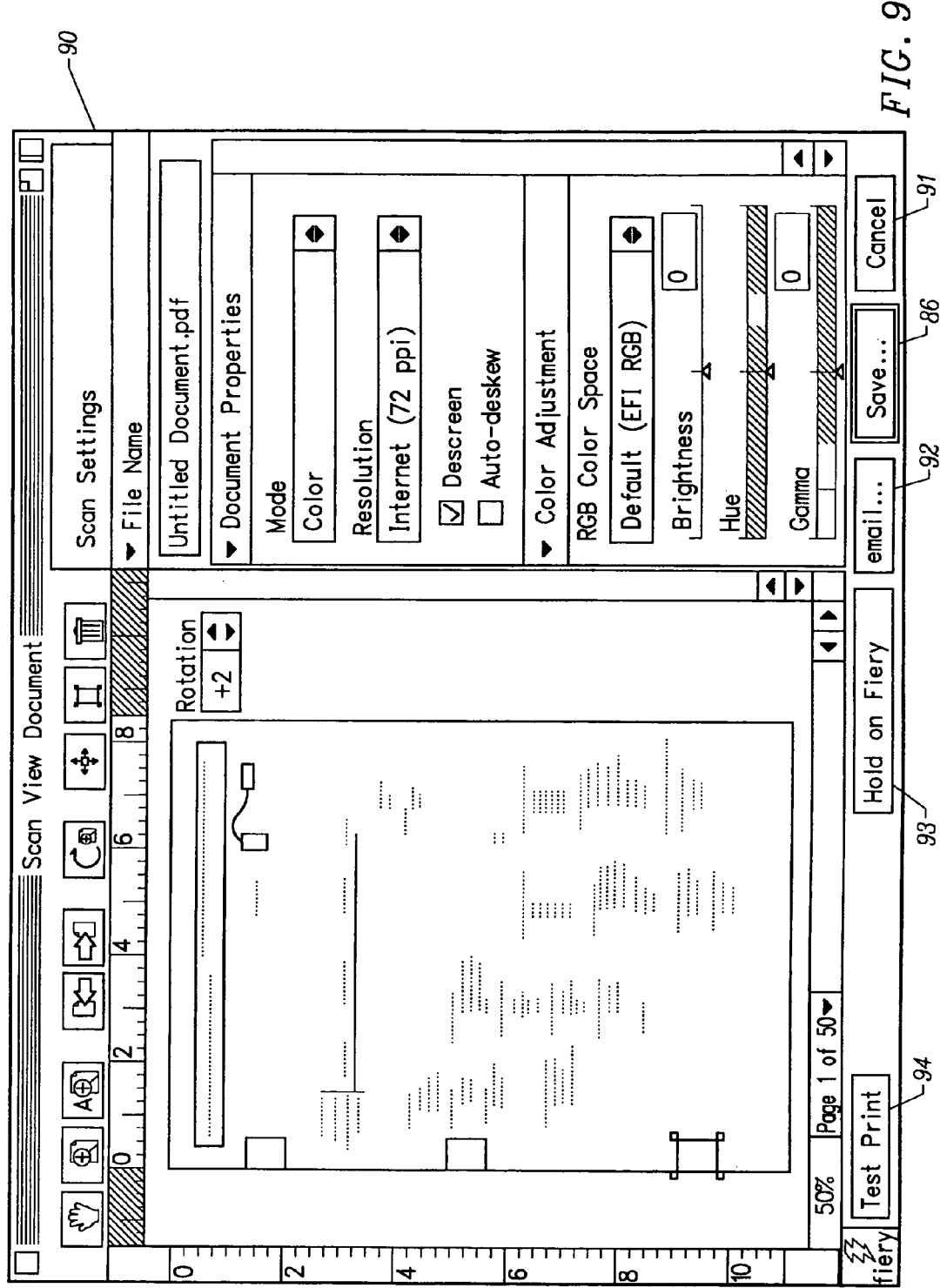
FIG. 9 shows a user interface for viewing and modifying document scans in the scanning software application of FIG. 6, according to the invention.
Figure 10:
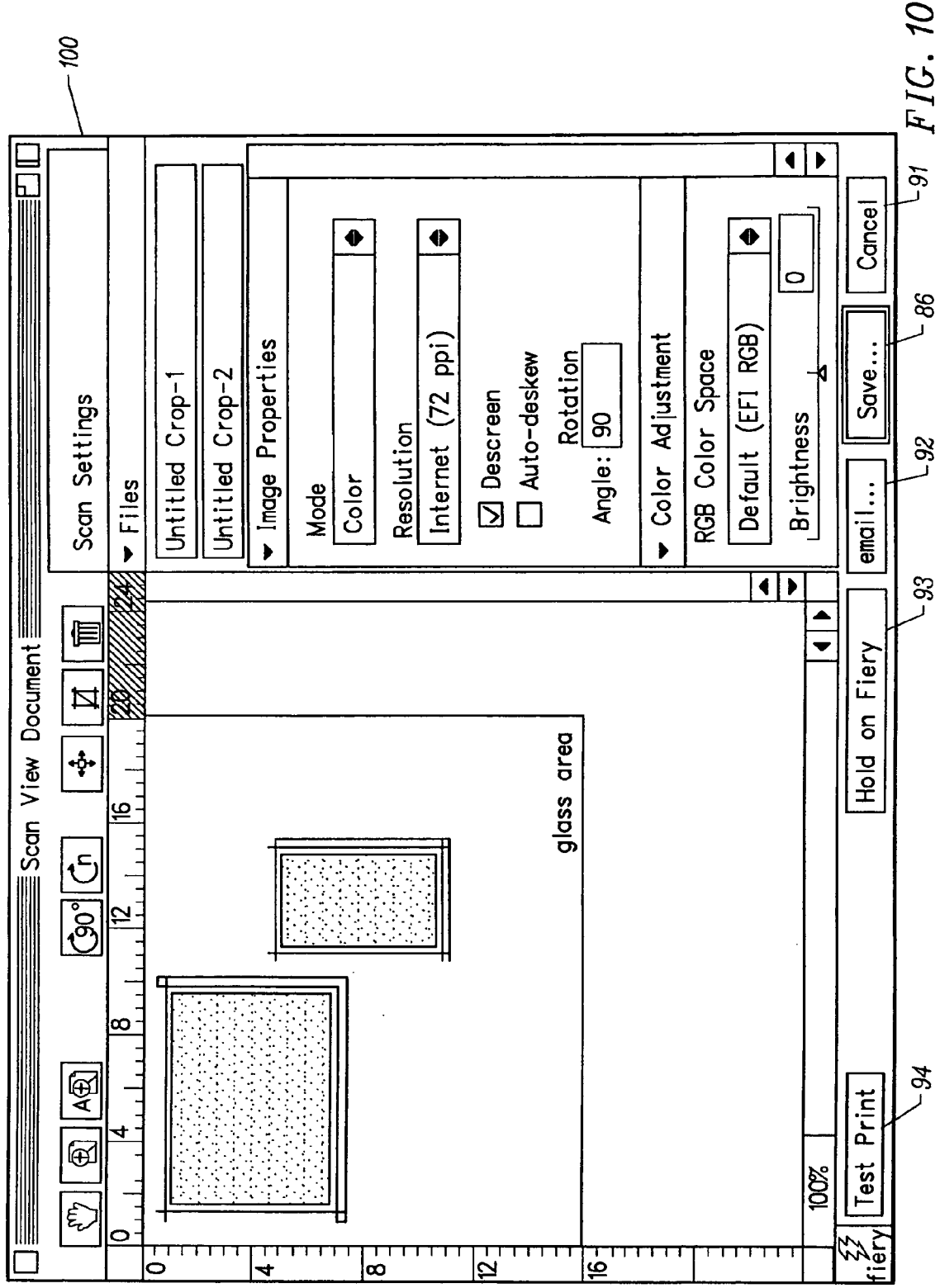
FIG. 10 shows a user interface for viewing and modifying image scans in the scanning software application of FIG. 6, according to the invention.

Although the scanning application gives the scan file a default file name, the user may override this feature and assign a file name of their choice. Instead of specifying a destination for the scan file, the user may first view the file by clicking the 'View' button 85, whereupon the file is opened and displayed in a user dialog as shown in FIGS. 9 and 10. FIG. 9 shows the interface for displaying a document file and FIG. 10 shows the interface for displaying an image file. From the two dialogs 90, 100 the user is able to make a variety of modifications to the scan file. Parameters to be modified may include one or more of:

Resolution
Scan mode
Brightness
Threshold
Contrast
Scaling
Original image
Color conversion
Color profile
Rotation
Crop
Unsharp mask
Deskewing
File format; and
Compression.

After making image modifications, the user may then specify a destination, as previously described. Both dialogs 90 and 100 have controls for saving and specifying a destination 86 and canceling image modifications 91, sending email notification 92 and doing a test print 94. Rather than specifying an alternate destination, the user may elect to hold the file on the color print server at its original location 93.

Figure 4:
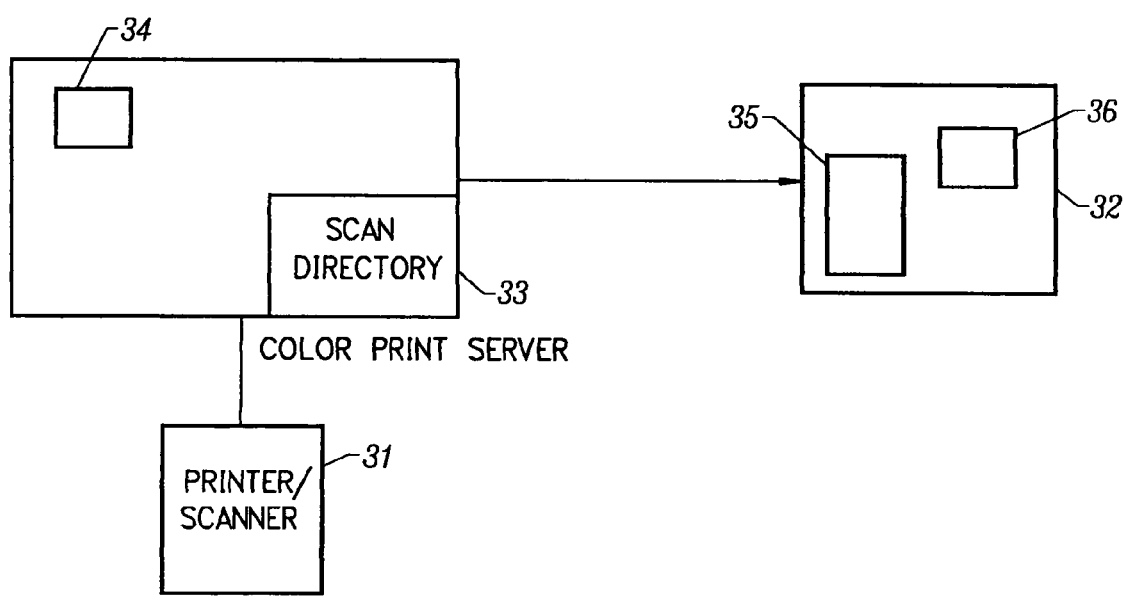
FIG. 4 provides a block diagram of an alternate architecture for the system of FIG. 3, according to the invention.

Although the invention has thus far been described within the context of particular system architecture, other embodiments of the invention employing alternative system architectures are possible. For example, as shown in FIG. 4, the scanning application 35 may reside on the client workstation 32 rather than on the color print server 33. Thus, within this architecture, all user activities are initiated from the client workstation, although they are still executed on the color print server.

Figure 5:
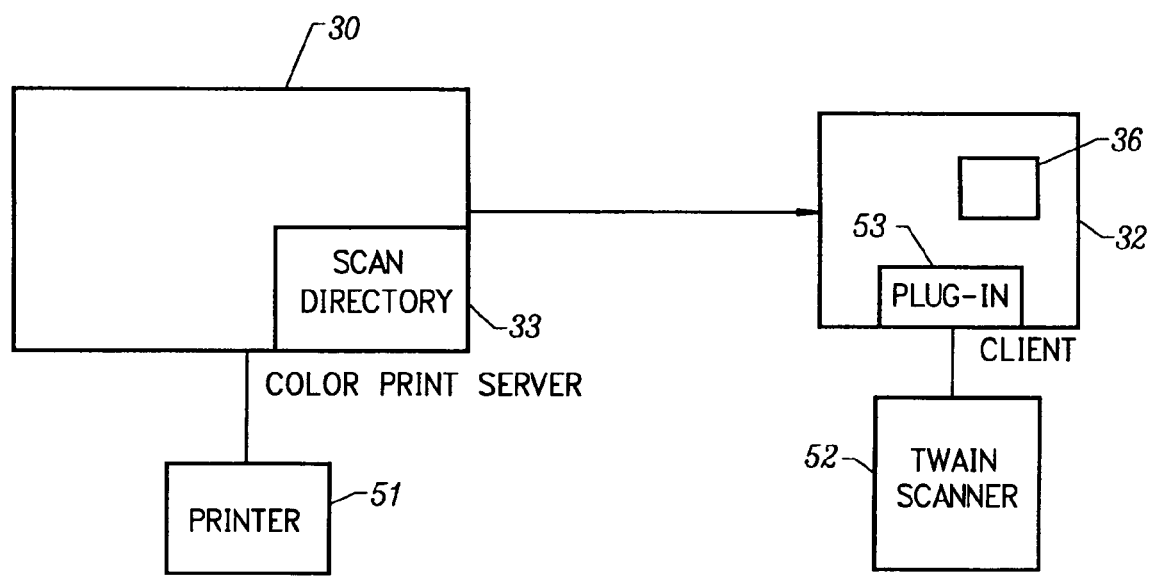
FIG. 5 provides a block diagram of a further alternate architecture for the system of FIG. 3, according to the invention.
Figure 11:
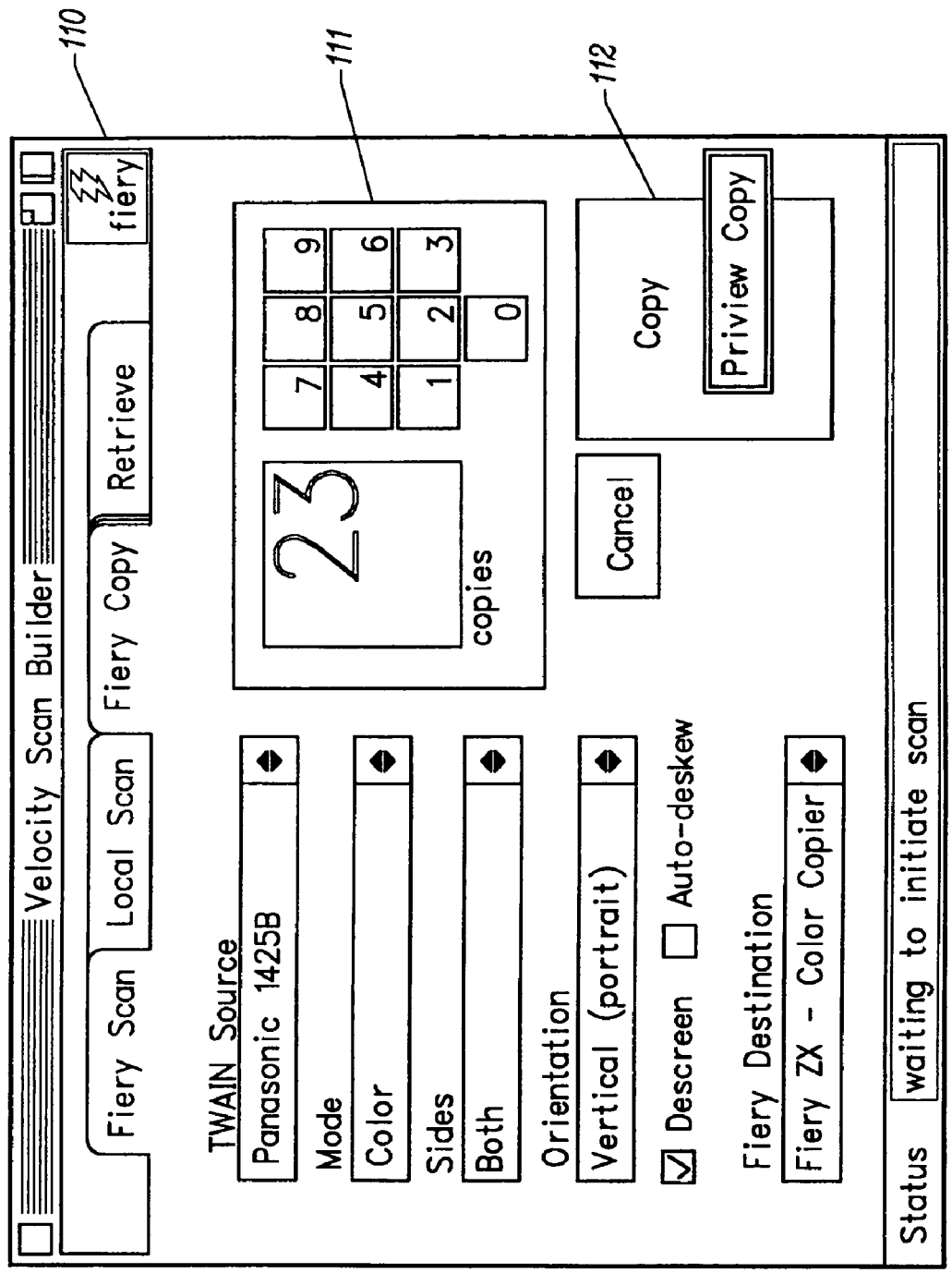
FIG. 11 shows a user interface for using a scanner and a color printer as a color copier in the scanning software application of FIG. 6, according to the invention.

In another system architecture, instead of a printer/scanner 31 connected to the color print server 30, a third party TWAIN scanner 52 is attached to the client workstation, as shown in FIG. 5. A plug-in 53 resident on the client workstation 32 works with the third party scanning software to provide most of the functionality of the original scanning software. As shown in FIG. 7, the user may specify a local TWAIN source, rather than a network scan. The TWAIN plug-in 53 and third party scanner 52 allow the color print server to be combined with an attached printer 51 to function as a color copier. As shown in FIG. 11, a dialog 110 provides interlace elements 111 and 112 to emulate the control panel of a color printer.

According to a further alternate embodiment (not shown), the color printer server is embedded in a color copier, with the interface to the color print server comprising the control panel on the color copier.

The foregoing merely illustrates the principles of this invention, and various modifications can be made by persons of ordinary skill in the art without departing from the scope and spirit of this invention.

The invention claimed is:

1. A method comprising:
    providing a print device for printing on sheets of paper coupled with a graphical user interface (GUI) said GUI further comprising a pointing device;
    providing at least a first and second document files each comprising a plurality of pages, wherein at least one document file from among the first document file and the second document file comprises a scan file;
    providing a merge template for creating a merged print file comprising a plurality of said pages, wherein the merge template comprises tools for specifying pagination in said merged print file and imposition of multiple pages on one or more of the sheets of paper;
    displaying a thumbnail page image of each of the pages and a visual representation of said merge template on the GUI;
    providing a user a drag-and-drop selection means via the GUI for:
        selecting at least one thumbnail page image from the first document file by clicking on the thumbnail page image with the pointing device and dropping said at least one thumbnail page image into said visual representation of a merge template; and
        selecting at least one additional thumbnail page image from the second document file by clicking on the at least one thumbnail page image with the pointing device and dropping said at least one additional thumbnail page image into said visual representation of a merge template, wherein the at least one thumbnail page image and the at least one additional thumbnail page image comprise selected page images;
    combining the selected page images using said merge template, wherein the merge template incorporates scripted merging instructions for precisely re-sizing one or more of the selected pages and layout options for the precise placement of one or more of the selected pages in a multiple pages per sheet format, forming combined page images;
    graphically re-arranging the combined page images within the merge template according to any desired order to create a new document file; and
    printing said new document file using said print device.

2. The method of claim 1, wherein the merge template further comprises at least one of:
    specified color choices;
    specified print options.

3. The method of claim 1, wherein the merging instructions comprise any of:
    specified color choices;
    and
    specified print options.

4. The method of claim 1, wherein the first document file comprises a raster data file, and wherein providing further comprises optionally converting the first document file to any of a bitmap file and a page description language (PDL) file.

5. The method of claim 4, wherein the PDL comprises any of POSTSCRIPT, Portable Document Format and Page Construction Language.

6. The method of claim 1, wherein providing the first document file comprises:
    providing a scanning device and a color print server;
    scanning a document, wherein a user initiates and customizes a scan using a software module; and
    storing the scan file.

7. The method of claim 6, wherein the software module comprises the GUI.

8. The method of claim 6, wherein the software module resides on the color print server, the color print server being embedded in a color copier, and wherein a control panel of the color copier comprises an interface to the software module.

9. The method of claim 6, wherein the software module resides on a client workstation in communication with the color print server.

10. The method of claim 6, wherein the scan file is stored on a mass storage device coupled to the color print server.

11. The method of claim 6, wherein the scan file is stored on a mass storage device coupled to a client workstation.

12. The method of claim 6, wherein the scan file is stored to a network location specified by the user.

13. The method of claim 6, wherein the scanning device is equipped with an automatic document feeder.

14. The method of claim 6, wherein the scanning device comprises any of the platen of a copying machine and a dedicated scanner.

15. The method of claim 6, wherein the scanning device is coupled to the print server.

16. The method of claim 6, wherein the scanning device is coupled to a client workstation.

17. The method of claim 6, wherein scanning comprises specifying any of:
    a scanning device;
    one of an image scan and a document scan;
    video-based image modifications to be made during the scan, the modifications including compression and color space transformations;
    a scan mode;
    a resolution;
    any of single sided and duplex;
    a page orientation; and
    a destination for the scan file.

18. The method of claim 17, wherein specifying a destination comprises specifying any of:
    a file name for the scan file;
    a PDL format for the scan file;
    a network location for the scan file;
    an address for email notification of the scan file's location; and
    a fax destination for the scan file.

19. The method of claim 1, wherein providing the first document file comprises retrieving a stored scan file from a mailbox.

20. The method of claim 1, further comprising modifying the first document file, the modifications including any of scan mode;
    brightness;
    threshold;
    contrast;
    scaling;
    color conversion;
    rotate;
    crop;
    unsharp mask;
    deskewing;
    file format; and
    compression format.

21. The method of claim 1, further comprising saving merging instructions generated by the combining step as a merge template, wherein the merge template is usable at a future time with another set of document files.

22. A system comprising:
- a print device coupled with a graphical user interface (GUI) including a pointing device;
- means for providing at least a first and second document file each comprising a plurality of pages, wherein at least one document file from among the first document file and the second document file comprises a scan file;
- providing a merge template for creating a merged print file comprising a plurality of said pages, wherein the merge template comprises tools for specifying pagination in said merged print file and imposition of multiple pages on one or more of the sheets of paper,
- means for displaying a thumbnail page image of each of the pages and a visual representation of a merge template on the GUI;
- a drag-and-drop selection means provided to the user via the GUI, the drag-and-drop selection means further comprising;
  - means for selecting at least one thumbnail page image from the first document file by clicking on the thumbnail page image with the pointing device and dropping said at least one thumbnail page image into said visual representation of a merge template; and
  - a means for selecting at least one additional thumbnail page image from the second document file by clicking on the at least one thumbnail page image with the pointing device and dropping said at least one thumbnail page image into said visual representation of a merge template, wherein the at least one thumbnail page image and the at least one additional thumbnail page image form selected page images;
- means for combining the selected page images using said merge template, wherein the merge template incorporates scripted merging instructions for the precise placement of one or more of the selected pages in a multiple pages per sheet format, forming combined page images;
- a means for graphically re-arranging the combined page images within the merge template using the pointing device according to any desired order to create a new document file; and
- a means for printing the new document file by said print device.

23. The system of claim 22, wherein the first document file comprises a raster data file, and wherein means for providing further comprises means for optionally converting the first document file to any of a bitmap file and a page description language (PDL) file.

24. The system of claim 23, wherein the PDL comprises any of POSTSCRIPT, Portable Document Format and Page Construction Language.

25. The system of claim 22, wherein the means for providing the first document file comprises:
- a scanning device and a color print server;
- a software module for initiating and customizing a scan; and
- means for storing the scan file.

26. The system of claim 25, wherein the software module comprises the GUI.

27. The system of claim 25, wherein the software module resides on the color print server, the color print server being embedded in a color copier, and wherein a control panel of the color copier comprises an interface to the software module.

28. The system of claim 25, wherein the software module resides on a client workstation in communication with the color print server.

29. The system of claim 25, wherein the means for storing comprises a mass storage device coupled to the color print server.

30. The system of claim 25, wherein the means for storing comprises a mass storage device coupled to a client workstation.

31. The system of claim 25, wherein means for storing is adapted to store the scan file to a network location specified by the user.

32. The system of claim 25, wherein the scanning device is equipped with an automatic document feeder.

33. The system of claim 25, wherein the scanning device comprises any of the platen of a copying machine and a dedicated scanner.

34. The system of claim 25, wherein the scanning device is coupled to the print server.

35. The system of claim 25, wherein the scanning device is coupled to a client workstation.

36. The system of claim 25, wherein the software module may be used to specify any of:
- a scanning device;
- one of an image scan and a document scan;
- video-based image modifications to be made during the scan, the modifications including compression and color space transformations;
- a scan mode;
- a resolution;
- single sided and duplex;
- page orientation; and
- a destination for the scan file.

37. The system of claim 36, wherein the software module may be used to specifying any of:
- a file name for the scan file;
- a PDL format for the scan file;
- a network location for the scan file;
- an address for email notification of the scan file's location; and
- a fax destination for the scan file.

38. The system of claim 22, wherein means for providing the first document file comprises means for retrieving a stored scan file from a mailbox.

39. The system of claim 22, further comprising means for modifying the first document file, the modifications including any of:
- scan mode;
- brightness;
- threshold;
- contrast;
- scaling;
- color conversion;
- rotate;
- crop;
- unsharp mask;
- deskewing;
- file format; and
- compression format.

40. The system of claim 22, further comprising means for generating and saving a merge template comprising instructions for selecting, combining and arranging of page images, and wherein the merge template may be usable at a future time with another set of document files.

41. The system of claim 22, wherein means for combining comprises means for selecting and applying a previously created merge template, the merge template comprising instructions for combining the page images in a specified order.

42. The system of claim 41, wherein the merge template further comprises any of:
specified color choices;
and
specified print options.

43. The system of claim 22, wherein means for combining comprises means for applying scripted merging instructions for combining the page images in a specified order.

44. The system of claim 43, wherein the merging instructions comprise any of:
specified color choices;
and
specified print options.

* * * * *